United States Patent
Vaillancourt

(12) 
(10) Patent No.: US 6,712,422 B1
(45) Date of Patent: Mar. 30, 2004

(54) COMBINATION TRUCK-BOX COVER AND COLLAPSIBLE SHELTER

(76) Inventor: David E. Vaillancourt, 15 Pella Street, Chelmsford, Ontario (CA), P0M 1L0

( * ) Notice: Subject to any disclaimer, the term of this patent is extended or adjusted under 35 U.S.C. 154(b) by 0 days.

(21) Appl. No.: 10/461,492

(22) Filed: Jun. 16, 2003

(51) Int. Cl.$^7$ .................................. B60P 3/39
(52) U.S. Cl. .................. 296/165; 296/164; 296/170
(58) Field of Search ........................ 296/165, 164, 296/159, 100.07, 173, 170, 100.08, 169, 100.18, 26.07, 100.06

(56) References Cited

U.S. PATENT DOCUMENTS

| | | | | |
|---|---|---|---|---|
| 3,658,375 A | * | 4/1972 | Bowen | 296/165 |
| 3,708,199 A | * | 1/1973 | Throssell | 296/164 |
| 3,737,190 A | * | 6/1973 | Smith et al. | 296/159 |
| 3,743,346 A | * | 7/1973 | Senn et al. | 296/164 |
| 3,790,207 A | * | 2/1974 | Anderson | 296/164 |
| 3,858,744 A | * | 1/1975 | Garvert | 296/100.07 |
| 3,995,890 A | * | 12/1976 | Fletcher | 296/164 |
| 4,294,484 A | * | 10/1981 | Robertson | 296/164 |
| 4,566,729 A | * | 1/1986 | Magnino | 296/159 |
| 4,657,300 A | * | 4/1987 | Penny et al. | 296/173 |
| 4,768,824 A | * | 9/1988 | Andonian | 296/165 |
| 4,856,841 A | * | 8/1989 | Rafi-Zadeh | 296/165 |
| 5,143,417 A | * | 9/1992 | Philley et al. | 296/170 |
| 5,364,154 A | * | 11/1994 | Kaiser | 296/165 |
| 5,375,900 A | * | 12/1994 | Tessenyi et al. | 296/100.08 |
| 5,505,515 A | * | 4/1996 | Turner | 296/165 |
| 5,961,176 A | * | 10/1999 | Tilly | 296/165 |
| 6,007,142 A | * | 12/1999 | Gehman et al. | 296/170 |
| 6,086,134 A | * | 7/2000 | Cravens et al. | 296/165 |
| 6,102,468 A | * | 8/2000 | Lowrey et al. | 296/169 |
| 6,135,525 A | * | 10/2000 | Amann | 296/164 |
| 6,135,539 A | * | 10/2000 | Bailey et al. | 296/169 |
| 6,203,097 B1 | * | 3/2001 | Podgorney | 296/170 |
| 6,209,944 B1 | * | 4/2001 | Billiu et al. | 296/165 |
| 6,217,106 B1 | * | 4/2001 | Reckner, Jr. | 296/170 |
| 6,224,140 B1 | * | 5/2001 | Hoplock | 296/100.18 |
| 6,227,592 B1 | * | 5/2001 | Thacker | 296/26.07 |
| 6,283,536 B1 | * | 9/2001 | Muzyka et al. | 296/165 |
| 6,572,174 B2 | * | 6/2003 | Hernandez et al. | 296/163 |
| 6,604,777 B2 | * | 8/2003 | Neville | 296/165 |
| 2002/0163221 A1 | * | 11/2002 | Smith | 296/164 |
| 2003/0047958 A1 | * | 3/2003 | Yarbrough et al. | 296/100.06 |
| 2003/0146646 A1 | * | 8/2003 | Cervenka | 296/165 |

* cited by examiner

Primary Examiner—Kiran Patel
(74) Attorney, Agent, or Firm—Mike M. Gauthier

(57) ABSTRACT

A combination truck-box cover and collapsible tent-like shelter generally comprising a tonneau-type box cover adapted to contain generally all components of a tent shelter while allowing generally full access to the truck box, and especially that the shelter is adapted to extend to the end of an opened tail-gate and further so as to also be fitted to a short-box pickup truck. The bed portions thereby provide ample bed length even on a truck box of less than adequate length.

8 Claims, 7 Drawing Sheets

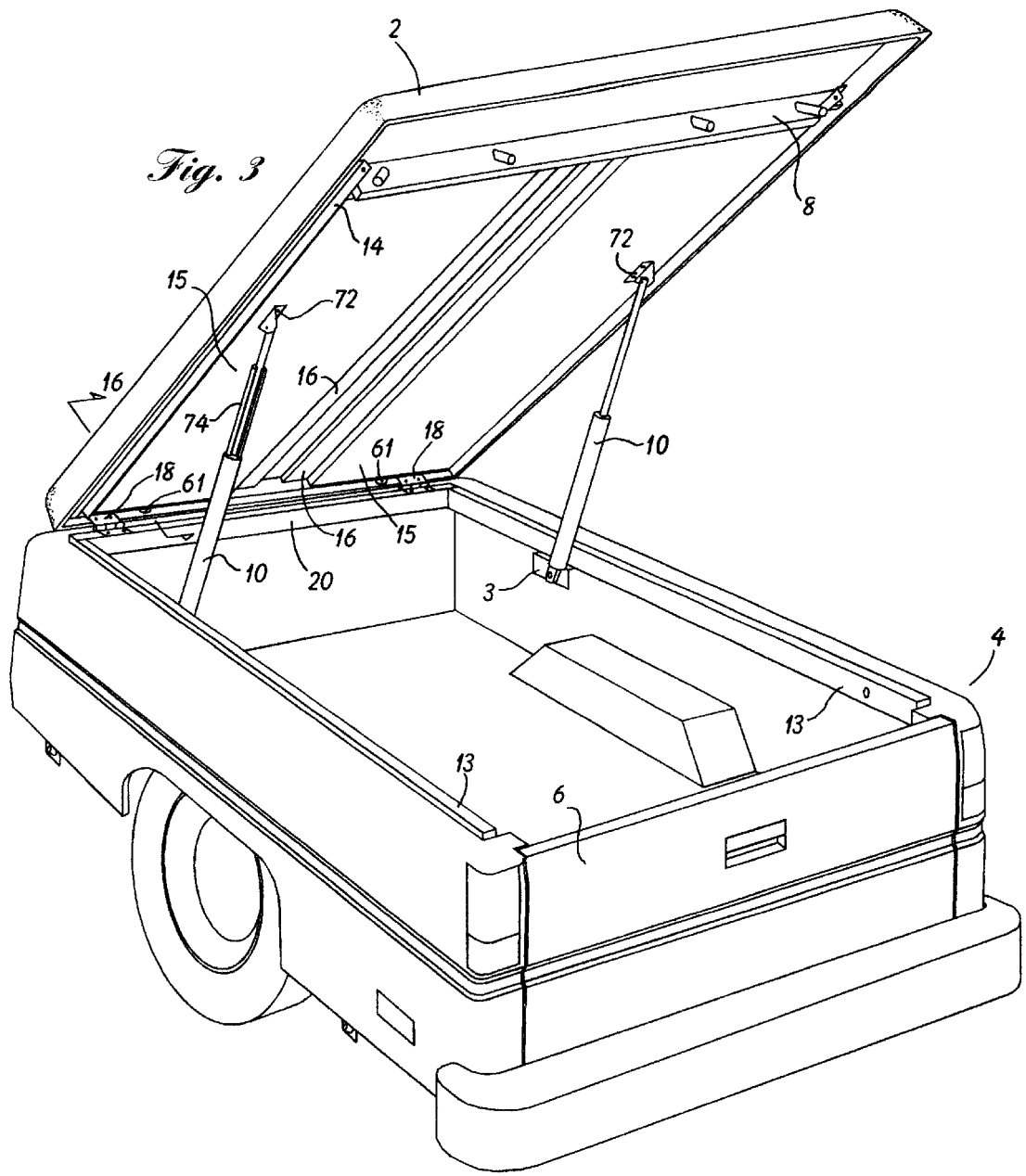

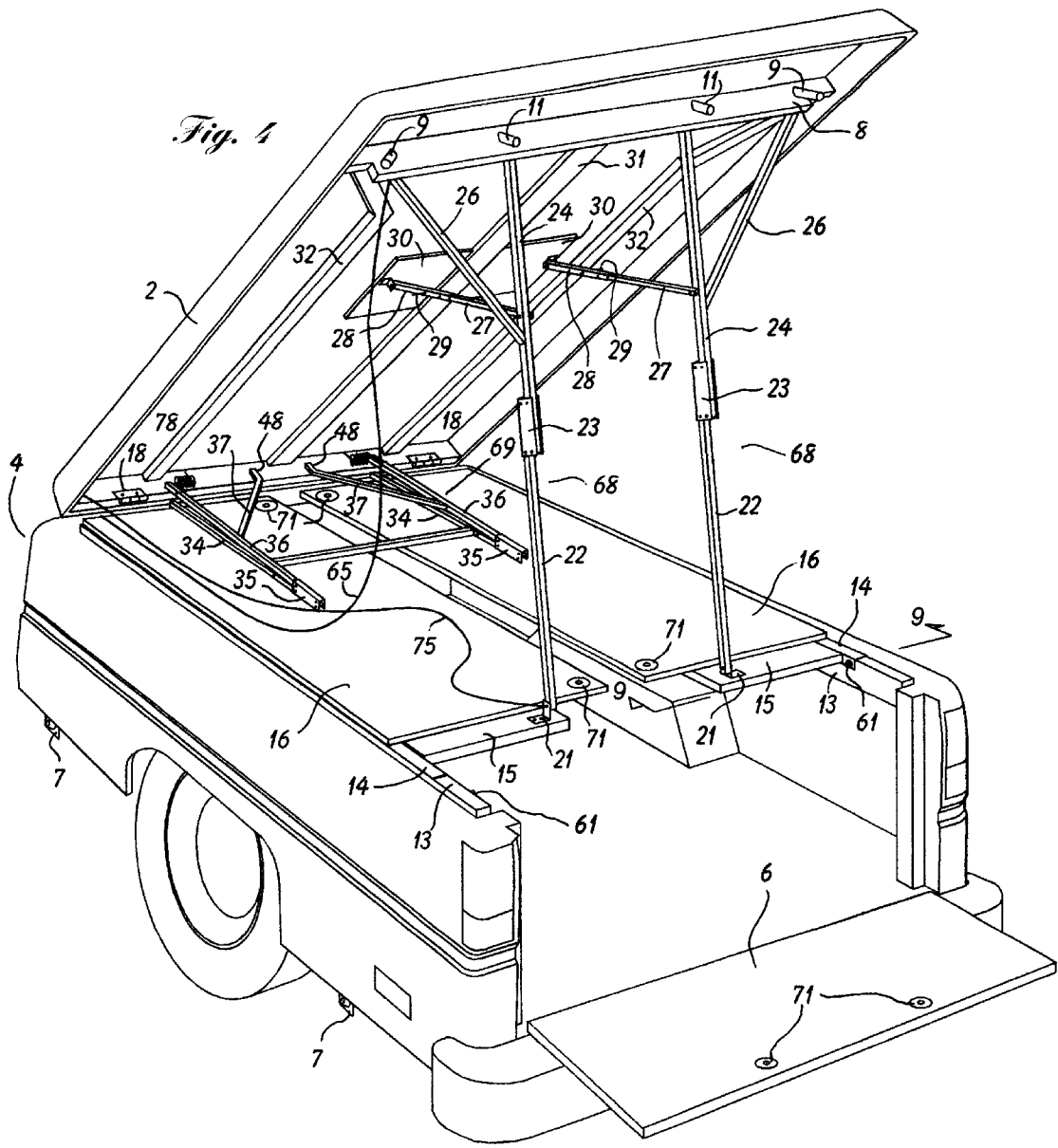

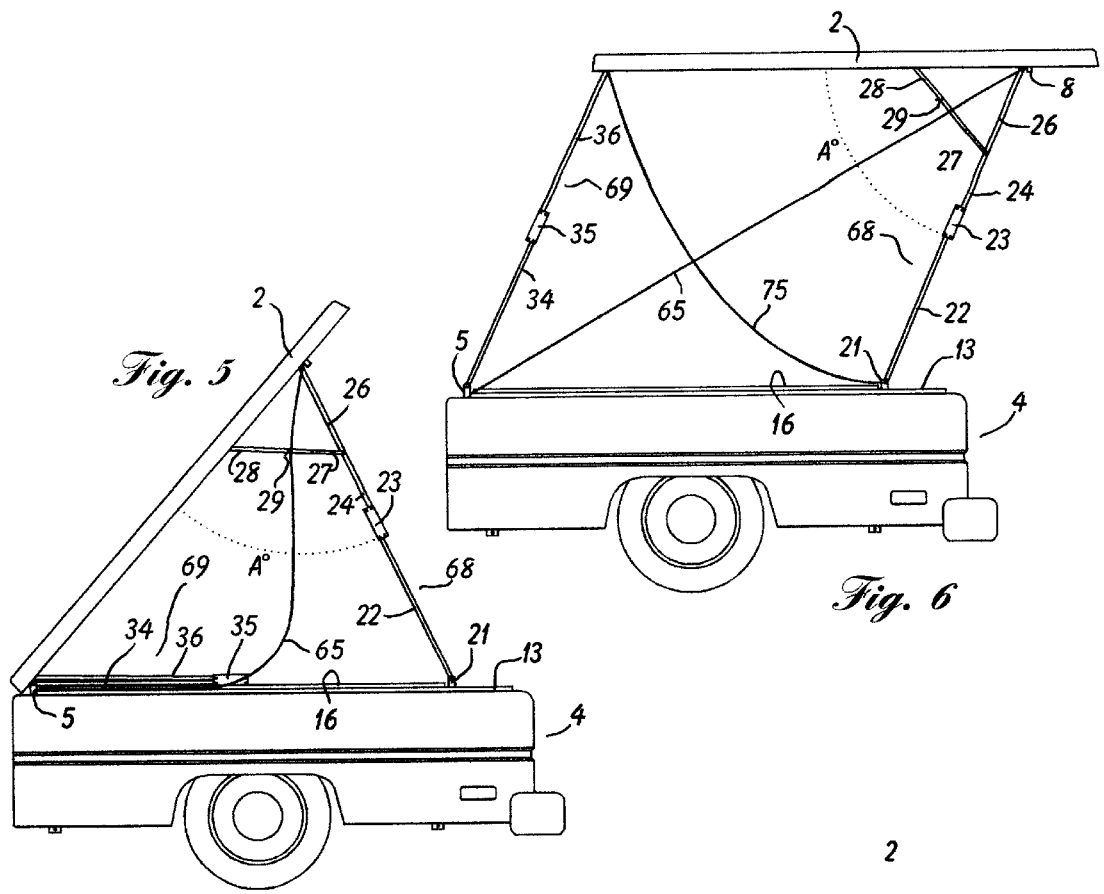
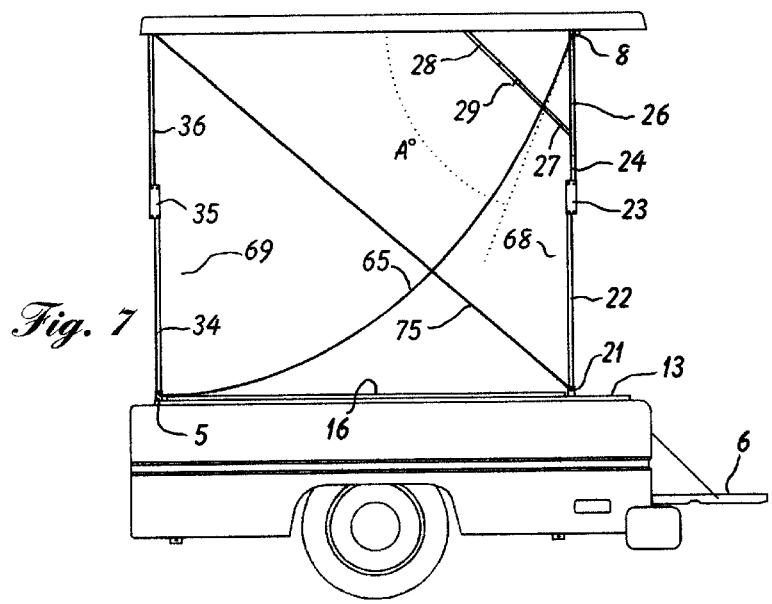

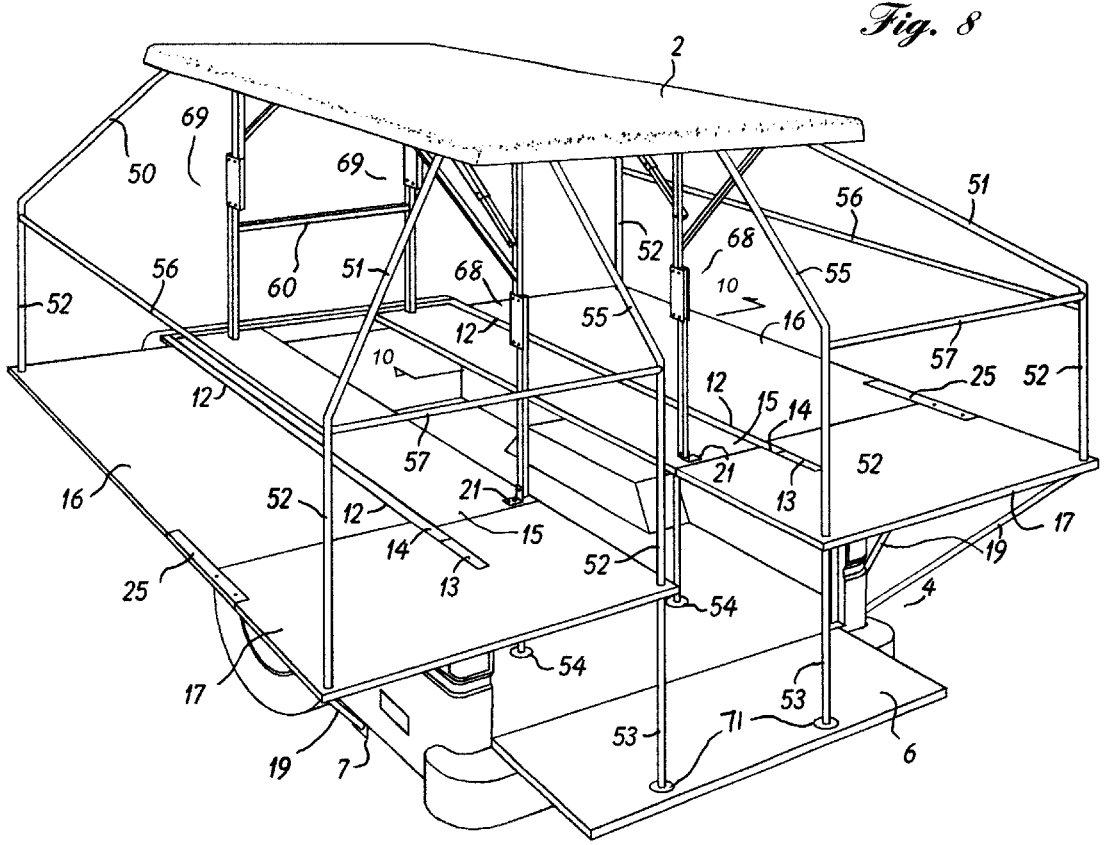
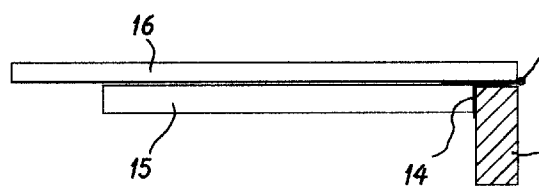
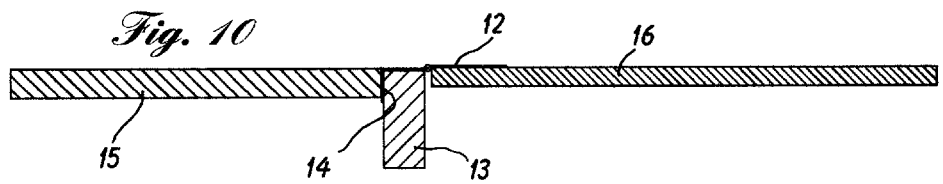

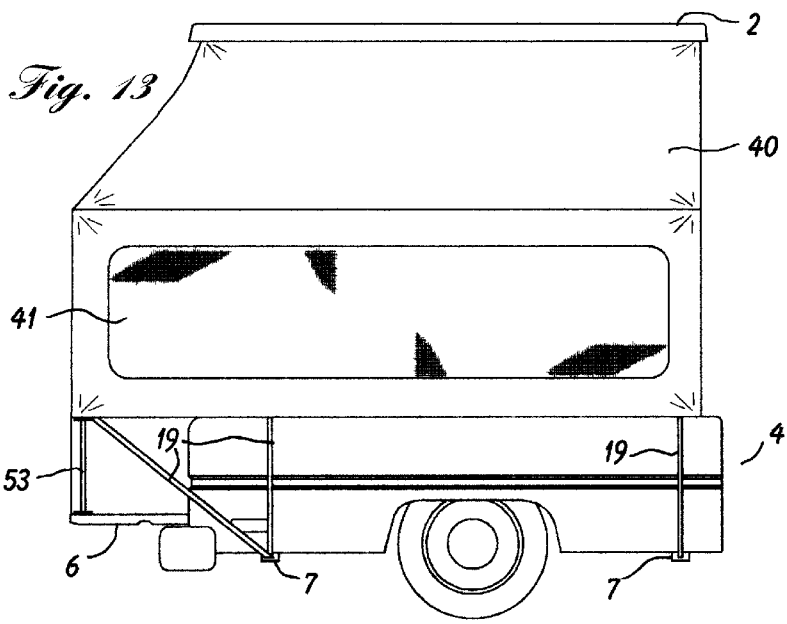
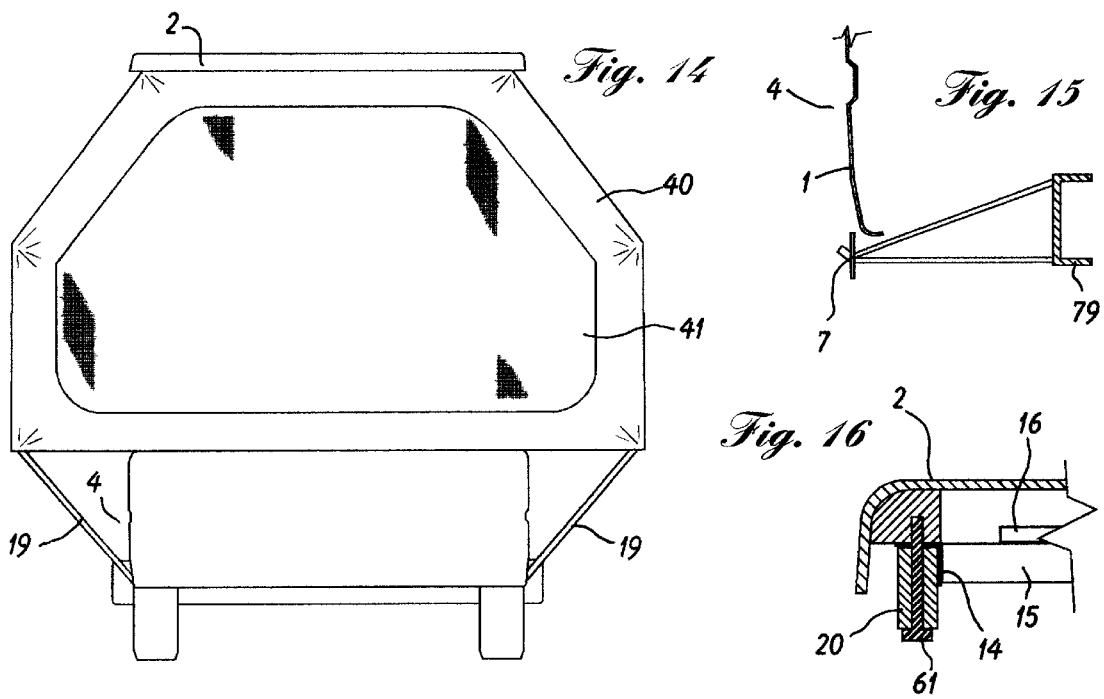
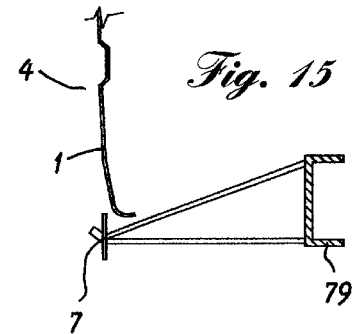
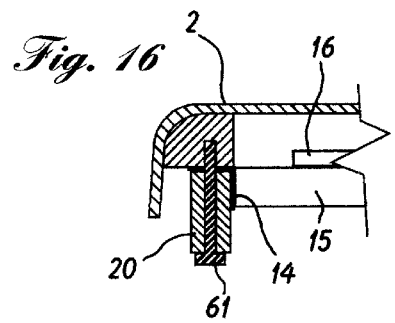

US 6,712,422 B1

COMBINATION TRUCK-BOX COVER AND COLLAPSIBLE SHELTER

FIELD OF THE INVENTION

The present invention relates to a combination truck-box cover and a collapsible tent-like shelter. The invention generally comprises a tonneau-type box cover adapted to contain components of a tent shelter while allowing generally full access to the truck box, and especially that the shelter is adapted to extend to the end of an opened tail-gate and further so as to be fitted to a short-box pickup truck.

BACKGROUND OF THE INVENTION

It has been desired by truck owners to have a shelter mounted to the truck box portion of a pickup truck while also having full usage of the truck box when the shelter is in collapse mode. Furthermore, truck boxes used to be commonly made in a length of eight feet long, while today, many trucks have a box length of six feet and some even four feet. Therefore if a tent were to be adapted to the short box trucks an average height person would not likely fit the shelter.

The applicant is aware of several attempts in prior art to provide a truck-box with a collapsible shelter. For example, reference may be had to U.S. Pat. No. 3,737,190 of Smith et al., issued Jun. 5, 1973, which describes a truck-box collapsible shelter wherein the unit can be erected on the ground or on the truck box itself. However, this invention fails to have the ability to extend outward toward the back of the truck to thereby allow mount ability onto short box trucks.

Another example of prior art may be had in referring to U.S. Pat. No. 3,790,207 of Anderson, issued Feb. 5, 1974, which depicts a hard-top truck box cover, which opens outwardly from the center to form a shelter that sleeps two person. However, this invention also fails to have the ability to extend outward toward the back of the truck to thereby allow mount ability onto short box trucks.

Another example of prior art may be had in referring to U.S. Pat. No. 4,294,484 of Robertson, issued Oct. 13, 1981, which depicts a tonneau-type truck box cover, which when opened, forms a tent shelter. However, this invention not only fails to have the ability to extend outward toward the back of the truck to allow mount ability onto short box trucks, but also fails to leave full access to the truck box.

While many attempts have been made to provide truck owners with collapsible shelter in combination with a box cover, none of the prior art combines the benefits of: rear extending properties for short box adaptability, generally full access to the truck box, and a water-tight cover for said box.

SUMMARY OF THE INVENTION

It is thus the object of the present invention to provide truck owners with a combination truck-box cover and collapsible shelter while having rearward extending features that allow installation to short box pickup trucks.

In one aspect of the invention, there is provided a tonneau-type cover adapted to contain components that make up a tent-like shelter.

In another aspect of the invention, the shelter may be adapted to fit as small as a four foot short-box truck thereby allowing an average height person necessary bed length for lying onto said bed.

Accordingly, the system of the present invention provides truck owners with a combination truck-box cover and a collapsible shelter having rearward extending features that allow installation to short box pickup trucks while leaving full access to the box when shelter is collapsed.

BRIEF DESCRIPTION OF THE DRAWINGS

These and other advantages of the invention will become apparent upon reading the following detailed description and upon referring to the drawings in which:

FIG. 3 is a perspective view from the rear of the combination truck-box cover and collapsible shelter of the present invention as viewed in the box access position.

FIG. 4 is a perspective view from the rear of the combination truck-box cover and collapsible shelter of the present invention as viewed in the initial set-up position a partial set-up position.

FIGS. 5, 6 and 7 are right side elevation views of the combination truck-box cover and collapsible shelter of the present invention illustrating the steps in erecting the framework and tonneau cap.

FIG. 8 is a perspective view from the rear of the combination truck-box cover and collapsible shelter of the present invention illustrating the cage members forming the outer fabric support.

FIG. 9 is a cross-sectional view taken from FIG. 4.

FIG. 10 is a cross-sectional view taken from FIG. 8.

FIG. 13 is a left side elevation view of the combination truck-box cover and collapsible shelter of the present invention.

FIG. 14 is a front elevation view of the combination truck-box cover and collapsible shelter of the present invention.

FIG. 15 is a cross sectional view taken from FIG. 1.

FIG. 16 is a cross sectional view taken from FIG. 3.

Figure 1:
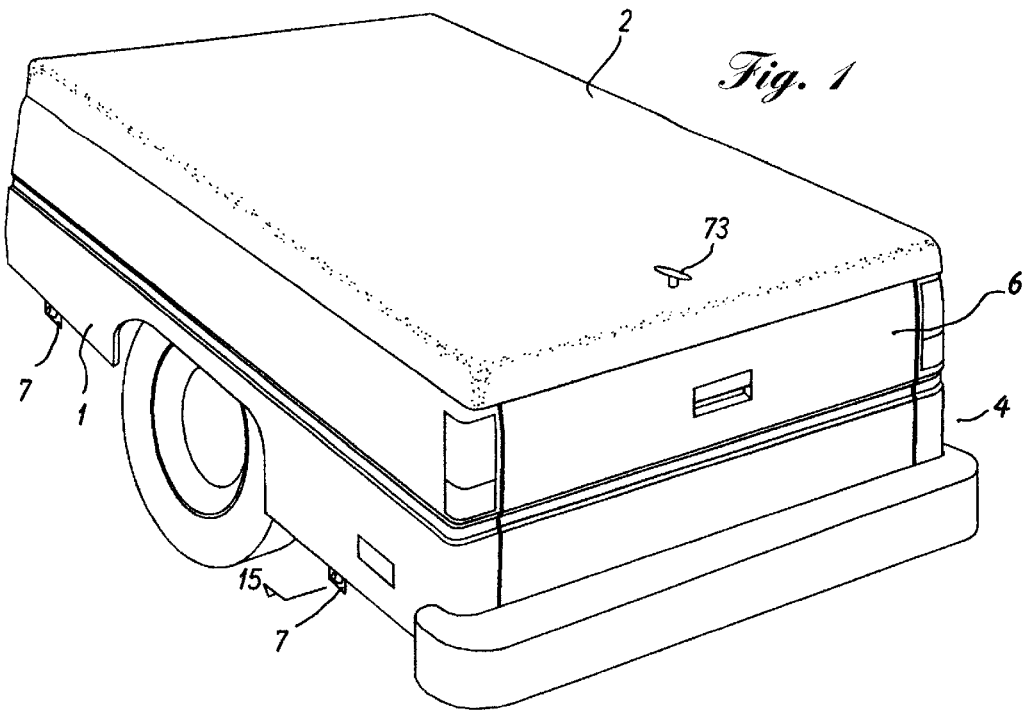
FIG. 1 is a perspective view from the rear of the combination truck-box cover and collapsible shelter of the present invention as viewed in the collapsed position.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENT

In the following description, similar features in the drawings have been given similar reference numerals.

Turning to the drawings, in particular, FIG. 1, illustrating a rear perspective view of a pickup truck box 4 adapted with the tonneau-type cover 2 forming part of the present invention. The pickup truck's tailgate 6 is able to be opened in this collapsed position, and the tonneau cover 2 is also able to be opened by unlatching the hold-down latch 73. Bed support brackets 7 are fixedly attached to the truck's frame and extend outwardly toward the truck box's 4 side panels 1.

Figure 2:
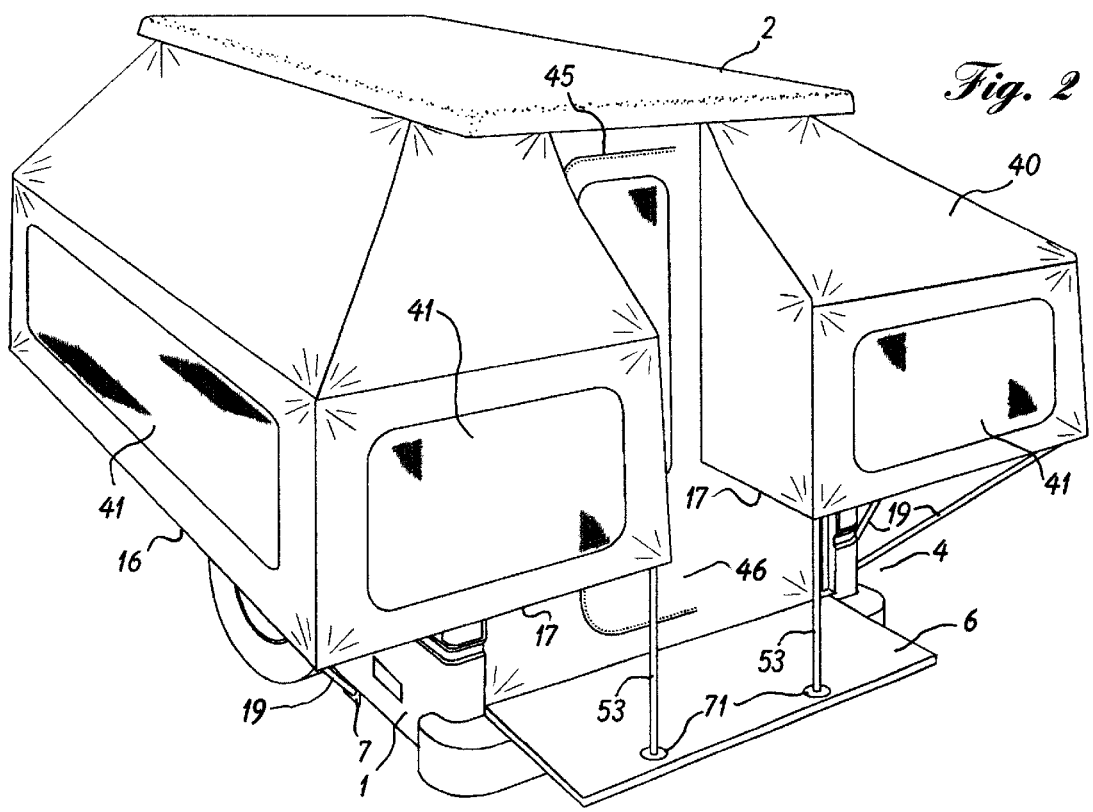
FIG. 2 is a perspective view from the rear of the combination truck-box cover and collapsible shelter of the present invention as viewed in as fully erect shelter.
Figure 11:
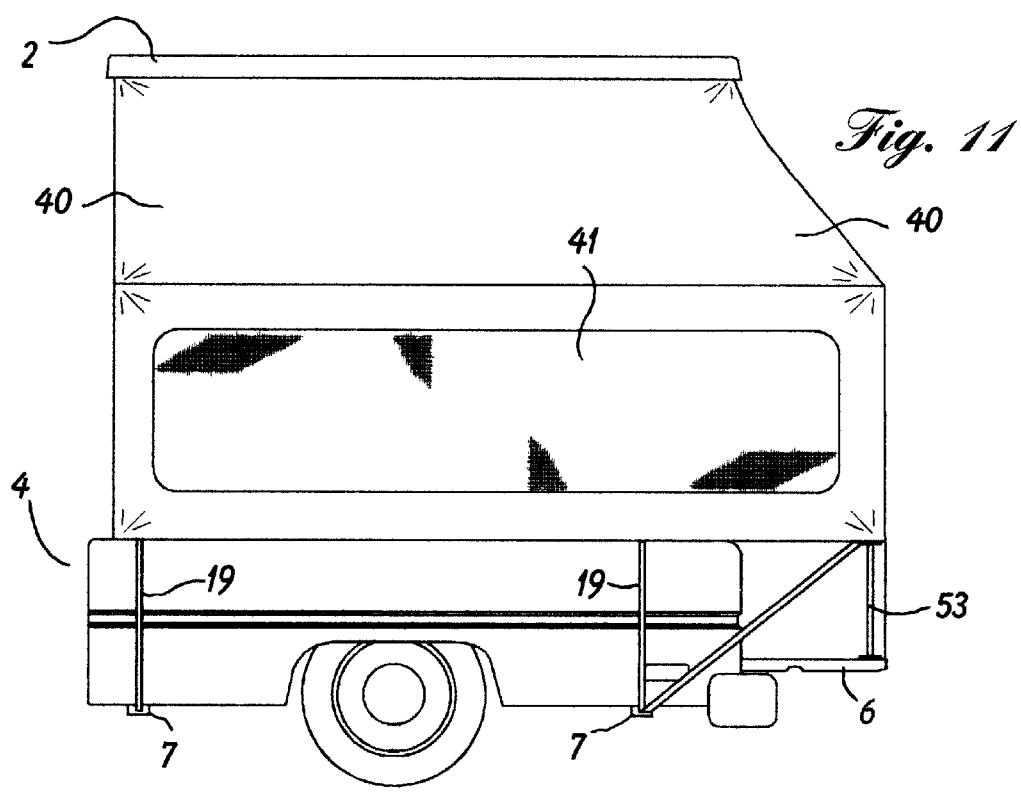
FIG. 11 is a right side elevation view of the combination truck-box cover and collapsible shelter of the present invention.

Turning to FIG. 2, which illustrates a rear perspective view of a pickup truck box 4 adapted with the combination truck-box cover and collapsible shelter of the present invention comprising: a tonneau-type cover 2 having a generally planar upper surface and side member protruding downwardly from the cover's 2 perimeter, a sheet material covering 40 fitting around a structural framework and supported by diagonal support members 19 and rear vertical support members 53. Each diagonal support members 19 is engaged to a flange bracket 71 fixedly attached the lower portion of the outer bed panels 16 and to fixedly attached bed support brackets 19. The rear vertical support members 53 are engaged to the lower surface of the bed extension panels 17 and to the upper rear-most surface of the opened tailgate 6 by means of flange brackets 71 fixedly attached to said bed extension panels 17 and tailgate 6. The outer bed panels 16 are supported by diagonal bed-panel supports 19, which are engaged to bed-panel support brackets 7, fixedly attached to the truck's frame and extend outwardly toward the truck box's 4 side panels 1. The sheet material covering 40 is generously adapted with venting screen 41 around the vertical portion at the perimeter of the sheet material covering 40.

Turning now to FIG. 3, a rear perspective view of the combination truck-box cover and collapsible shelter of the present invention as viewed in the box-access position wherein, in this opened position, the tonneau-like cover 2 is viewed housing and attached to collapsed components that make up the shelter system of the present invention. These collapsed components are hinged to a central box frame member 20 which said box frame member is releasably attached to the front most inner portion of the cover 2 by means of latch bolts 61 securely and releasably attached to the front inner portion of the cover 2 thereby providing a secure attachment to the truck box 4 when tonneau cover 2 is in a closed position, ready for travel. In erecting the shelter system, these latch bolts 61 would therefore be relocated to fasten through the angle member 14 into the side box members 13 at each inner side of the truck box.

The cover 2 and collapsed shelter components are thereby combined as one lid-like structure hinged at the front most inner edge of the truck box 4 and supported by two or more compression cylinders 10. Said cylinders 10 are pivotally attached to: the lid-like structure with an upper pivoting bracket 72, and to the truck box 4 by means of a lower pivoting bracket 3 fixedly attached to a side box frame member 13 also fixedly attached to the inner upper vertical edge at each side of the truck box 4. The lower pivoting bracket 3 is adapted to be releasable from the cylinder 10 in order to relieve the cylinder's pressure while the present invention is in an erected state.

The cover 2 and shelter assembly may be removed quickly by removing the hinge 18 pins and disengaging the pin holding the cylinder 10 to the lower pivoting bracket 3.

Referring now to FIG. 4, a rear perspective view of the initial erection of the shelter system of the present invention wherein, to begin setup, raise tonneau cover 2 to access inner truck box compartment, attach safety sleeves 74 to piston portion of each cylinder 10, release panel latches 67 in order to separate the bed panel portions 15 and 16 from the cover 2 portion, remove front latch bolts 61 to release cover 2 portion from shelter portion and place said latch bolts 61 through the angle member 14 then into the side box members 13 at each inner side of the truck box. The user is now able to hinge the cover 2 upwardly. The rear portion of the cover 2 is lifted first and supported by a pair of folding legs 68, which lock in a generally upright position by means of a locking device 23 forming part of the leg 68. A telescopic diagonal support 25 is provided comprising: an upper member 28 having a generally tubular form with two of more perforations traversing said tube, a lower member 27 also having a generally tubular form and an outside diameter of generally equal or slightly lesser outside dimension than that of the inside dimension of the upper member 28 but with one perforation traversing said tube, and a locking pin 29 adapted to longitudinally engage the upper and lower members of the telescopic diagonal support 25. Once the cover 2 is raised and supported by the rear folding legs 68, the user engages the telescopic diagonal support 25 located between the mid section of the rear folding legs 68 and to the central flange support 30 at the lower surface of the cover 2. Rotary springs 78 are provided in order to assist in raising the cover 2 from the bed panel portions.

In reference now to FIG. 5, a right side elevation view of the combination truck-box cover and collapsible shelter of the present invention as viewed in an initial setup position. A tether 65 is securely and releasably attached to the rear cover beam 8 and to the central box frame member 20. It must be understood that the rear folding legs 68 and cover 2 are now locked in a fixed angle in relation to each other by means of the telescopic diagonal support 25 and the cover 2 and rear folding leg assembly 68 now have a pivot point at the lower most extremity of the rear folding legs 68. The tether 65 at this time is in a relaxed state, which will become taught upon rotably raising the front portion of the cover 2.

Referring now to FIG. 6, illustrating the cover 2 and rear folding leg assembly 68 pivotally raised to a point where: the cover 2 surface is lever with the truck box 4, and the tether 65 is taught thereby preventing overthrowing of the cover 2 and rear folding leg assembly 68. Meanwhile, as the cover 2 and rear folding leg assembly 68 are pivotally raised, the front folding leg assembly 69 unfolds until the upper and lower members 36 and 34 and longitudinally aligned with each other, ready to be locked in this position by means of the leg locking device 35. Note that the angle 70 between the cover 2 and rear folding leg assembly 68 remains the same in FIG. 6 as it was in FIG. 5.

Referring now to FIG. 7, illustrating the final position of the fully erect cover 2 and folding legs assemblies 68 and 69. This position is achieved by momentarily disengaging the locking pin 29 from the telescopic diagonal support 25 thereby allowing longitudinal telescopic motion between the upper and lower members of the telescopic diagonal support 25 while the user, standing atop the opened tailgate 6, pushes back the tethered cover 2 and folding leg assemblies 68 and 69 until the perforations within the upper and lower members of the telescopic diagonal support 25 align to allow the user to re-engage the locking pins 29 to positively maintain a squared position between the cover 2 and folding legs assemblies 68 and 69. A second safety tether 75 is provided to prevent this last motion to send the whole units forward. These tethers 65 and 75 can be removed when the locking pins 29 are traversely engaged into both upper and lower members of the telescopic diagonal support 28 and 27 and possibly used as clotheslines inside or outside the shelter.

Turning to FIG. 8, a rear perspective view of the combination truck-box cover and collapsible shelter of the present invention illustrating a fill erection of the shelter system with the exception of the sheet material covering.

Referring momentarily now to FIGS. 9 and 10, FIG. 9 illustrating a cross sectional view taken from FIG. 4 depicting both inner and outer bed panels 15 and 16 wherein the outer bed panel 16 is folded inward against the top surface of the inner bed panel 15 by means of a continuous hinge 12 fixedly attached to an angle member 14, which is also fixedly attached to the outer edge of the inner bed panel 15 thereby forming an assembly, which rests upon the upper surface of the side box frame member 13. FIG. 10 depicts the outer bed panel 16 pivotally opened toward the outside of the side box frame member 13 so as to provide an even planar bed surface atop both inner and outer bed panels 15 and 16.

Figure 12:
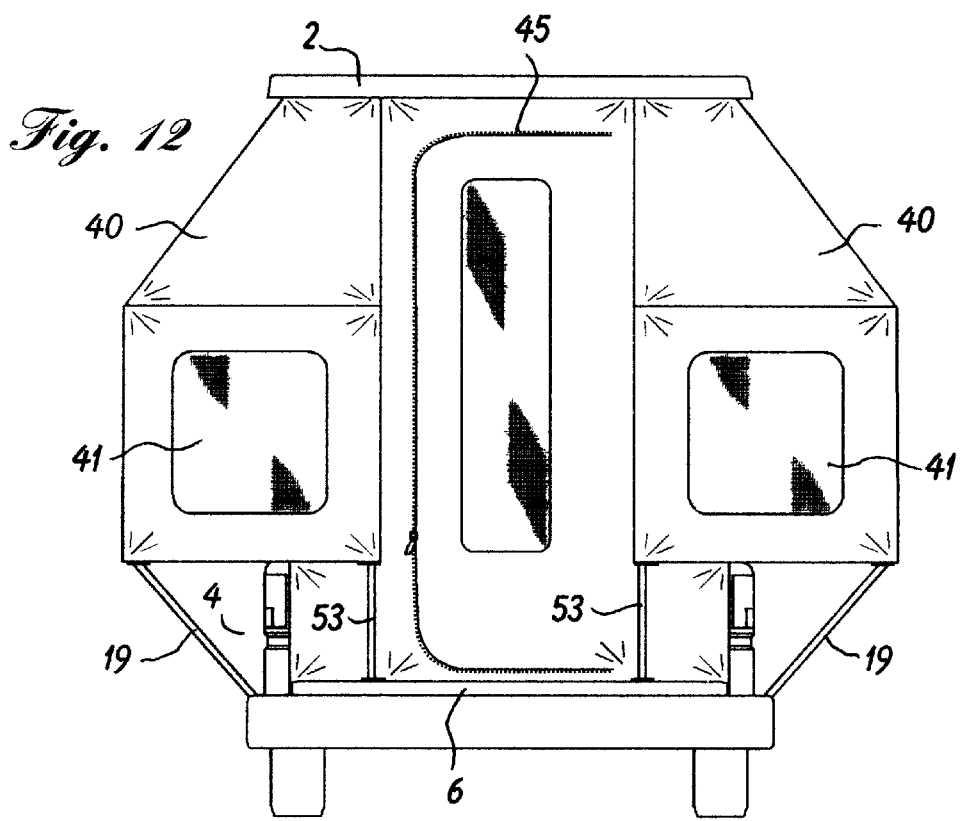
FIG. 12 is a rear elevation view of the combination truck-box cover and collapsible shelter of the present invention.

Turning now to FIG. 12, one can see that the outer bed panels 16 are supported by diagonal bed-panel supports 19, which are engaged to bed-panel support brackets, fixedly attached to the truck's frame and extend outwardly toward the truck box's 4 side panels 1.

Now back to FIG. 8, also depicting the rear extension bed panels 17 having a width equal to the combined width of the opened inner and outer panel assembly 15, 16 and the side box frame member 13 thus acting as a continuance or extension of the bed surface thereby enabling an average height person ample bedding surface on which to lie even if the truck box length is of lesser length than the aforementioned person.

An array of strategically positioned vertical poles 52 are juxtaposed along the upper surface of the perimeter of the full bedding surface made up of bed panels 15, 16 and 17. Horizontal pole members 56 and 57 are provided to hold up the sheet material covering and to help rigidify the whole pole assembly. Diagonal front pole members 50 are provided to join the vertical pole members 52 to the mating pole brackets fixedly attached to the under side at the front of the cover 2. Rear outer diagonal pole members 51 are provided to also join the rear vertical pole members 52 to the rear portion of underside of the cover 2. A pair of center rear diagonal pole members 55 are provided to form an alcove at the rear of the shelter so as to result in a vertically planar surface to which a zippered door is provide for egress to the shelter.

With reference now to FIGS. 11, 12, 13 and 14, all illustrating elevation views from all side of the combination truck-box cover and collapsible shelter of the present invention wherein the sheet material covering 40 having a generous amount of venting screen 41 in the vertical portions. The sheet material covering 40 is formed to comply with the form made by the pole assembly.

Referring now to FIG. 15, a cross sectional view taken from FIG. 1, illustrating a preferred embodiment of the means to extend the bed panel support 19 from the truck's frame 79. This device may be welded or bolted to said frame 79.

In reference now to FIG. 16, a cross sectional view taken from FIG. 3, depicting the latch bolts 61 traversing the front box frame member 20 and angle member 14, and securely and releasably attaching to a fixed support member of the cover 2. This Figure also illustrates the relative position of the inner bed panel 15 and the angle member 14. These are fixedly attached.

What i claim as my invention:

1. A combination truck-box cover and collapsible shelter comprising:
   a. a tonneau-like cover adapted to contain most components for a collapsible tent shelter,
   b. a central box frame member fixedly attached to the front most inner surface of a truck box distal to the tailgate,
   c. a pair of side box members fixedly attached to the inner upper surface of each left and right sides of a truck box,
   d. an inner bed panel and an outer bed panel for each side of the truck box,
   e. extension panels adapted to extend the length of both inner and outer bed panels,
   f. diagonal bed-panel supports adapted to gravitationally engage to a female receiver at the bottom surface at each end of the outer bed panels and to bed-panel support brackets fixedly attached to the lower portion of a truck's frame and extend outwardly toward the truck box's side panels,
   g. a folding leg assembly having two front legs, and two rear legs both adapted with diagonal supports extending upwardly and inwardly from the front legs and upwardly and outwardly from the rear legs,
   h. a structural framework having vertical members extending upwardly from all outer most extremities of the upper surfaces of the outer bed panels so to form a ribbing adapted to hold the shelter's outer sheet-material covering,
   i. erecting control members having a generally telescopic assembly of tubes, one fitting inside the other, a locking pin member traversing through perforations aligned at strategic locations within said telescopic tubes,
   j. erecting tethers having a length only sufficient to retain the tilting cover so as to prevent said cover and folding leg assembly from over-swinging in either forward or rearward direction.

2. The combination truck-box cover and collapsible shelter of claim 1, wherein the outer bed panels are of a lesser length than the length of the inner bed panels so as to allow fixed mounting of folding leg brackets while allowing said outer bed panel to hinge upwardly and inwardly toward the central region of the truck box.

3. The combination truck-box cover and collapsible shelter of claim 1 wherein the extension bed panels are formed to mate planarly with the end rear portions of the outer and inner bed panels so as to result in a generally even bed surface area.

4. The extension bed panels of claim 3, further comprising a generally C-shaped cap at the outer edge nearest the mating outer bed panel and extending half its length onto the outer edge of said outer bed panel so as to rigidify the planar assembly.

5. The combination truck-box cover and collapsible shelter of claim 1, wherein the tonneau-like cover is of a sufficient depth to accept generally all components of the collapsible shelter.

6. The combination truck-box cover and collapsible shelter of claim 1, wherein the use for the present invention comprises generally: a collapsible shelter having the ability to sleep a more than average height person even if the truck box is shorter than said average person.

7. The combination truck-box cover and collapsible shelter of claim 6, wherein a further use comprises the generally full use of the truck's box even when the present invention is installed thereon.

8. The combination truck-box cover and collapsible shelter of claims 1 through 7 wherein the use for said combination truck-box cover and collapsible shelter is for the adaptation of a cover for a pickup truck box with a tent-like shelter having the ability to easily extend the bedding length beyond the opened tailgate of a short box truck and provide bedding area for four users, all while maintaining generally full use of the truck box when shelter is collapsed.

* * * * *